United States Patent
Chen et al.

(10) Patent No.: US 9,582,563 B1
(45) Date of Patent: Feb. 28, 2017

(54) GENERATION OF A DIMENSIONAL DATA STRUCTURE

(71) Applicant: International Business Machines Corporation, Armonk, NY (US)

(72) Inventors: Zhen Chen, Shanghai (CN); Wei Huang, Shanghai (CN); Yan Fang Ji, Wuxi (CN); Bo Tian, Shanghai (CN); Bei Bei Xu, Shanghai (CN); Miao Zhang, Shanghai (CN); Zi Qing Zhang, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/989,866

(22) Filed: Jan. 7, 2016

(51) Int. Cl.
G06F 17/00 (2006.01)
G06F 17/30 (2006.01)

(52) U.S. Cl.
CPC .. G06F 17/30592 (2013.01); G06F 17/30185 (2013.01)

(58) Field of Classification Search
CPC .... G06F 3/0619; G06F 3/0659; G06F 3/0688; G06F 3/0689; G06F 12/0246; G06F 17/30241
See application file for complete search history.

(56) References Cited

U.S. PATENT DOCUMENTS

| 7,035,925 B1* | 4/2006 | Nareddy ........... G06F 17/30864 463/37 |
| 8,381,193 B2 | 2/2013 | Cervantes |
| 2009/0070463 A1 | 3/2009 | Cowart et al. |
| 2011/0054854 A1* | 3/2011 | Williamson .......... G06T 11/206 703/2 |
| 2014/0119196 A1 | 5/2014 | Hui et al. |
| 2014/0136896 A1 | 5/2014 | Tak et al. |

FOREIGN PATENT DOCUMENTS

WO 2012027691 A2 3/2012

OTHER PUBLICATIONS

Anamika et al., "Log Aggregator for Better Root-Cause-Analysis", Department of Computer Engineering, Savitribai Phule Pune University, Pune—Maharashtra—411015, International Journal of Computer Science and Information Technologies (IJCSIT), vol. 6 (2), 2015, pp. 1100-1102.
Splunk®, "Splunk® Products", 6 pages, printed on Nov. 3, 2015, <http://www.splunk.com/en_us/products.html>.
VMware®, "vRealize Insight: Log Managment & Analytics", 5 pages, printed on Nov. 3, 2015, Copyright © 2015 VMware, Inc., <http://www.vmware.com/products/vrealize-log-insight>.
Weblog Expert, "Powerful log analyzer", 2 pages, printed on Nov. 3, 2015, Copyright © 2002-2015 Alentum Software Ltd., <http://www.weblogexpert.com/>.

* cited by examiner

Primary Examiner — Truong Vo
(74) Attorney, Agent, or Firm — Steven L. Fisher-Stawinski; Lance I. Hochhauser

(57) ABSTRACT

A computer-implemented method includes identifying a plurality of log entries. The method includes receiving one or more criteria. The one or more criteria are applicable to the plurality of log entries. The method includes generating a dimensional data structure. The dimensional data structure is defined in a dimension for each of the one or more criteria. The method includes loading the plurality of log entries into the dimensional data structure based on the one or more criteria. A corresponding computer program product and computer system are also disclosed.

18 Claims, 4 Drawing Sheets

GENERATION OF A DIMENSIONAL DATA STRUCTURE

BACKGROUND

The present invention relates generally to the field of managing log data and more particularly to handling log entries across a distributed or complex environment.

In a distributed or complex system, there may be numerous log entries associated with a particular job or document. Multiple and duplicate log entries may be stored on many different nodes or components. This may result in a significant backlog of log entries which may be identical, differ only slightly, or otherwise describe the same event. Programmers continue to face difficulties organizing logs of log entries.

SUMMARY

A computer-implemented method includes identifying a plurality of log entries. The method includes receiving one or more criteria. The one or more criteria are applicable to the plurality of log entries. The method includes generating a dimensional data structure. The dimensional data structure is defined in a dimension for each of the one or more criteria. The method includes loading the plurality of log entries into the dimensional data structure based on the one or more criteria. A corresponding computer program product and computer system are also disclosed.

DETAILED DESCRIPTION

Figure 1:
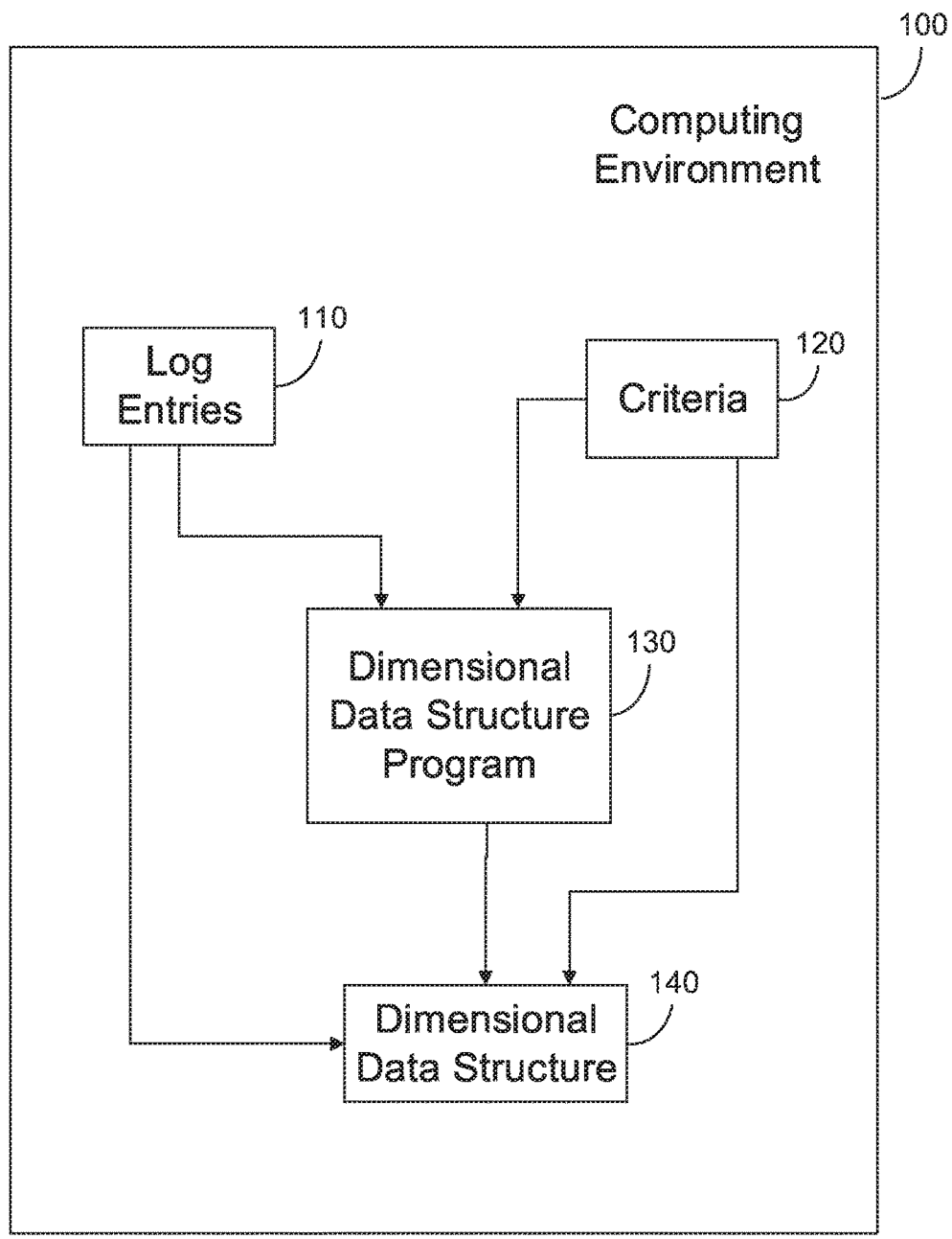
FIG. 1 is a block diagram of a computing environment suitable for operation of a dimensional data structure program, in accordance with at least one embodiment of the present invention.

FIG. 1 is a block diagram of a computing environment suitable for operation of a dimensional data structure program, in accordance with at least one embodiment of the present invention. A computing environment 100 includes log entries 110, criteria 120, a dimensional data structure program 130, and a dimensional data structure 140, all in mutual communication and interconnected via the computing environment 100. The computing environment 100 may be a cloud-based, virtual, or distributed environment or a remote environment on defined server hardware, or, more generally, the computing environment 100 may be any type of environment suitable for access by the dimensional data structure program 130. The computing environment 100 may be a system communicating with server and/or client programs operating in mutual communication. In such an embodiment, the computing environment 100 may include a database for log entries and criteria associated with each of the server and/or client programs.

The dimensional data structure program 130 may receive the log entries 110 and the criteria 120 as input and generate the dimensional data structure 140 as output. The log entries 110 may be loaded into the dimensional data structure 140 via the computing environment 100 and/or via the dimensional data structure program 130.

The log entries 110 may be a collection of files, documents, and/or logfiles. The log entries 110 may record events that occur in an operating system or as a software program runs. The log entries 110 may be messages between different users of a communication software. In some embodiments, each log entry of the log entries 110 has attributes and/or meta-attributes in common with other log entries of the log entries 110. For example, each log entry may have an author, such as a human user or an application, or a timestamp associated with the log entry's creation.

The criteria 120 may be predetermined attributes that are applicable to each log entry within the log entries 110. For example, the criteria 120 may be time, such as a timestamp or how long it took each particular log entry to be created. The criteria 120 may be log level. A log entry's log level refers to the version of the log, such as whether a given log file is a first or subsequent version. The criteria 120 may be a context for each log entry. Context may be information about a log entry's environment. For example, a log entry's context may be that that log entry was executed as a part of a batch process. The criteria 120 may be predetermined according to embodiment-specific considerations. In some embodiments, the criteria 120 is at least three in number. In such embodiments, the criteria 120 may include at least three criteria that are applicable to the log entries in the log entries 110.

The criteria 120 may be spatial context aspects that are applicable to each log entry within the log entries 110. For example, the criteria 120 may be context granularity, context oath, context aspects, overlap elimination, and/or spatial context filter.

Context granularity is a ranking system for the log entries 110. Context granularity sorts the log entries 110 based on the problem complexity and/or an analysis requirement for each log entry within the log entries 110. For example, a granularity size order, decreasing in size may be: a cluster, a node, a service, a component, a package, a class, and a function.

Context path is a vector. Context paths may be used to connect two granularities, such as context granularities. A context path may include a direction, an input, and an output for the two granularities.

Spatial context connects granularities to construct a logic layer. For example, in embodiments where the criteria 120 are at least three in number spatial context may involve creating layers along one of the criteria 120. For example, one of the criteria 120 may be a step function, such as author, so that a log entry is either by a certain author or is not. Each log entry for a particular author may be sorted based on two other of the criteria 120. In such an example, each author would have a layer or two-dimensional plane associated with it. Spatial context connects granularities between different layers.

The dimensional data structure program 130 receives the log entries 110 and categorizing the log entries 110 based on each of the criteria 120. In some embodiments, the dimensional data structure program 130 is IBM® Watson®. In some embodiments, the dimensional data structure program 130 is a general purpose log management program.

The dimensional data structure program 130 may generate the dimensional data structure 140 as output. The dimensional data structure 140 may store the log entries 110. The dimensional data structure 140 may be a multidimensional array wherein each linear dimension of the array corresponds to one of the criteria 120. In some embodiments, the dimensional data structure 140 has three dimensions. In such an embodiment, the dimensional data structure 140 may be a three dimensional scatterplot.

The dimensional data structure 140 provides an organizational structure for the log entries 110. Each dimension of the dimensional data structure 140 is based on one of the criteria 120. For example, in embodiments where one of the criteria 120 is a timestamp, one dimension of the dimensional data structure 140 may be time. In such an embodiment each of the log entries 110 are organized, by the dimensional data structure program 130, along the axis according to each of the log entries 110's timestamp. In embodiments where one of the criteria 120 is a log level, one dimension of the dimensional data structure 140 may be version. In such an embodiment each of the log entries 110 are organized, by the dimensional data structure program 130, along the axis according to which version the log entry is (first, second, third, etc.). In embodiments where one of the criteria 120 is context, one dimension of the dimensional data structure 140 may be step within a batch process. In such an embodiment each of the log entries 110 are organized, by the dimensional data structure program 130, along the axis according to their stage in a batch process (compiling, runtime, etc.).

Figure 2:
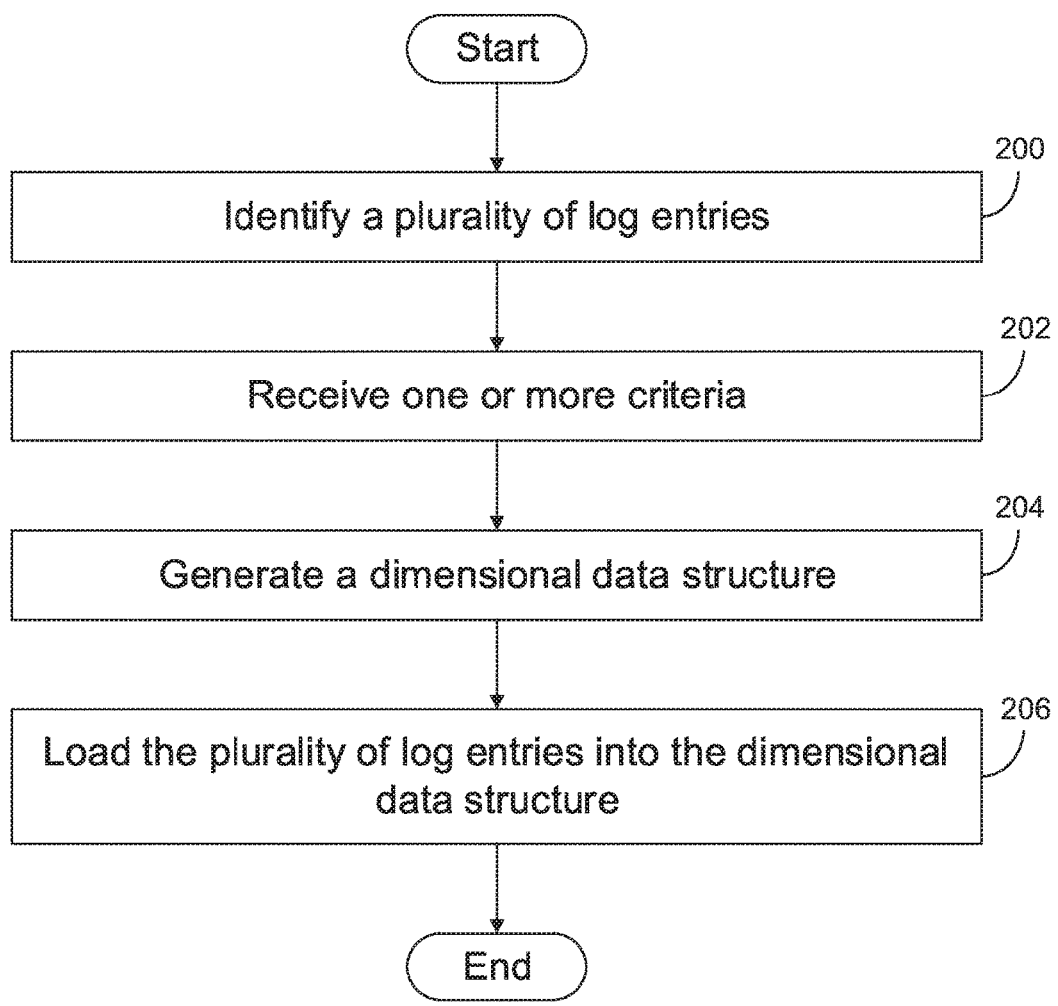
FIG. 2 is a flowchart depicting operational steps for a dimensional data structure program, in accordance with at least one embodiment of the present invention.

FIG. 2 is a flowchart depicting operational steps for the dimensional data structure program 130, in accordance with at least one embodiment of the present invention.

At step 200, the dimensional data structure program 130 identifies a plurality of log entries, such as the log entries 110. Identifying may include automated calls to the log entries 110, for example, from an integrated development environment or as part of the dimensional data structure program 130.

At step 202, the dimensional data structure program 130 receives one or more criteria, such as the criteria 120. Receiving may include a user explicitly calling the dimensional data structure program 130 from a command line interface using a reference to the criteria 120 as an argument, Alternatively, receiving may include automated calls to the dimensional data structure program 130, for example, from an integrated development environment or as part of a log entry management system.

At step 204, the dimensional data structure program 130 generates a dimensional data structure, such as the dimensional data structure 140. The dimensional data structure 140 may be a table, array, or scatterplot with as many dimensions as the criteria 120.

At step 206, the dimensional data structure program 130 loads the log entries 110 into the dimensional data structure 140. For example, if the dimensional data structure 140 has one of the criteria 120 and the one of the criteria 120 is a timestamp, the dimensional data structure program 130 loads the log entries 110 into the dimensional data structure 140 by placing them in chronological order. If the dimensional data structure program 130 receives two or more of the criteria 120, the dimensional data structure program 130 may load the log entries 110 similar to plotting data points onto a scatter plot, where each axis corresponds to one of the criteria 120.

Figure 3:
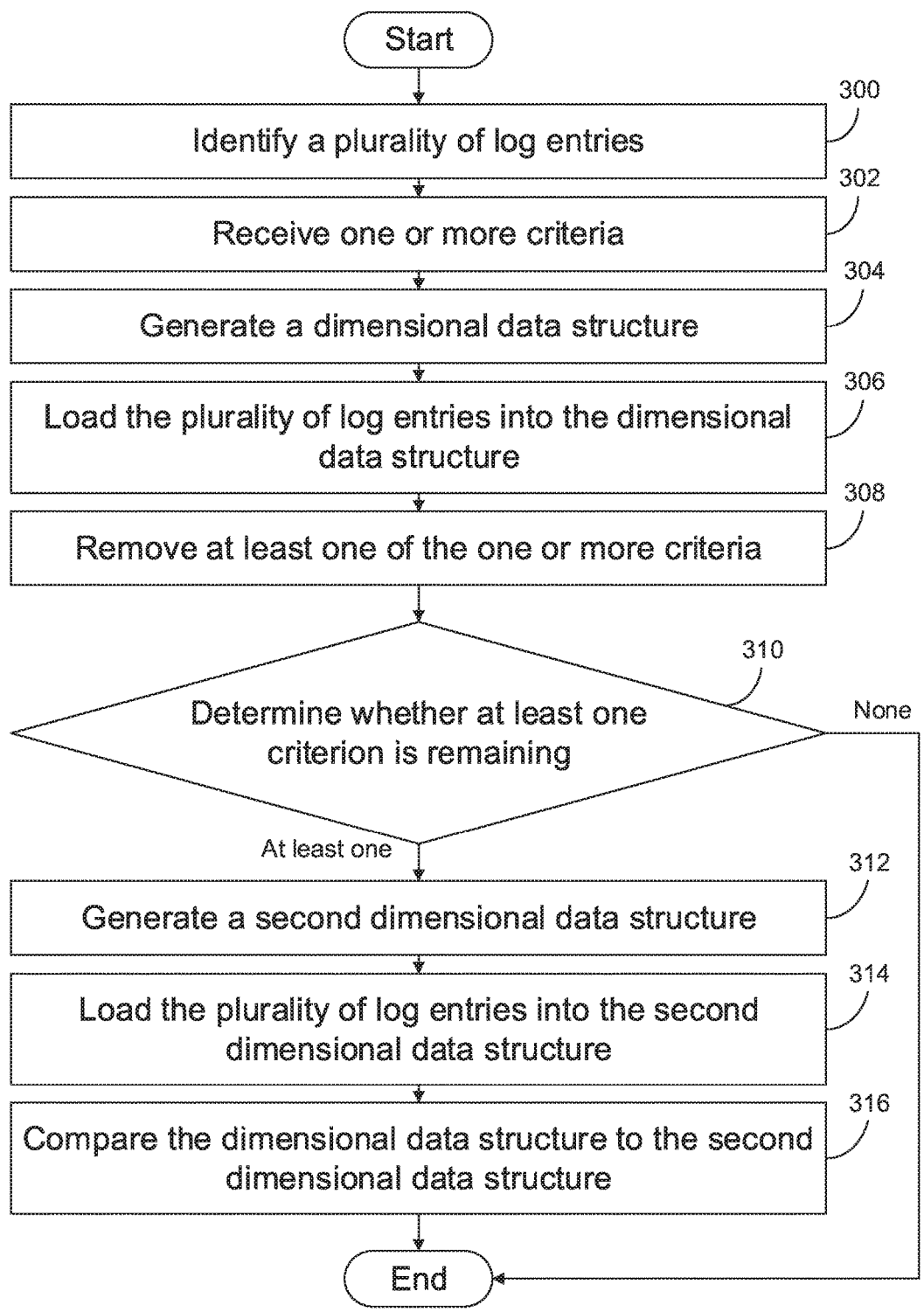
FIG. 3 is a flowchart depicting operational steps for a dimensional data structure program that compares dimensional data structures, in accordance with at least one embodiment of the present invention.

FIG. 3 is a flowchart depicting operational steps for the dimensional data structure program 130, in accordance with at least one embodiment of the present invention.

Step 300, step 302, step 304, and step 306 may be understood as similar to step 200, step 202, step 204, and step 206. The dimensional data structure program 130 performs step 300 in a way that is similar to step 200. The dimensional data structure program 130 performs step 302 in a way that is similar to step 202. The dimensional data structure program 130 performs step 304 in a way that is similar to step 204. The dimensional data structure program 130 performs step 306 in a way that is similar to step 206.

At step 308 the dimensional data structure program 130 removes at least one of the one or more criteria from the criteria 120. Removing the at least one criteria may be based on user input or as a function of an analytics engine, such as IBM® Watson®. Removing at least one criteria may permit broadening of a corpus or data set, according to embodiment-specific considerations.

At step 310 the dimensional data structure program 130 determines whether the criteria 120 has at least one criterion remaining. This may be done by the dimensional data structure program 130 counting objects within the criteria 120 to determine if objects exist within the criteria 120. If there are no remaining criteria, the dimensional data structure program 130 exits the program. If at least one criterion remains, the dimensional data structure program 130 proceeds to step 312.

At step 312 the dimensional data structure program 130 generates a second dimensional data structure, which includes one dimension fewer than the dimensional data structure 140. The dimensional data structure program 130 may generate the second dimensional data structure in a way that is similar to step 304.

At step 314 the dimensional data structure program 130 loads the log entries 110 into the second dimensional data structure in a way that is similar to the step 306.

At step 316 the dimensional data structure program 130 compares the dimensional data structure 140 to the second dimensional data structure. Comparing may include analyzing differences in, for example, size, structure, or context. Comparing may include identifying differences in log entries or a log entry's position within the dimensional data structure 140.

In some embodiments, the dimensional data structure program 130 may identify log paths within the dimensional data structure 140. Log paths within the dimensional data structure 140 may identify different versions of a particular logfile and trace the different versions' progression. In other embodiments, log paths may within the dimensional data structure 140 may identify log entries related to a particular software program or processing job. In some embodiments, the dimensional data structure program 130 identifies log paths within the dimensional data structure 140 by identifying commonalities between log entries. For example, the dimensional data structure program 130 may identify log entries with a common author. Such a commonality need not be included as a part of the criteria 120. A log path within the dimensional data structure 140 connects at least two of the log entries 110.

In embodiments where the dimensional data structure program 130 identifies a log path within the dimensional data structure 140, the dimensional data structure program 130 may identify a root for the log path. A root is a cause of an error that may occur in a software program or processing job. In such an embodiment, the dimensional data structure program 130 may receive an error message as a query from a user of the dimensional data structure program 130 and a root cause criteria, the root cause criteria being one of the criteria 120. For example, a user may indicate to the dimensional data structure program 130 that the error is a particular line of code. The user may indicate to the dimensional data structure program 130 that the dimensional data structure program 130 should identify the root cause based on a criteria of size, with a larger size being the root. In such an embodiment, the dimensional data structure program 130 may identify a root cause by identifying a log entry within the log entries 110 containing the largest log entry with the particular line of programming language code. In other embodiments, the user may indicate multiple of the criteria 120 to the dimensional data structure 140. In such an embodiment, the dimensional data structure 140 may identify, for example, an earliest and largest log entry or an earliest, largest, and occurring during a particular stage log entry.

In some embodiments, the dimensional data structure program 130 identifies overlapping log entries. An overlapping log entry may be, for example, a second version of the same log file with a different timestamp, but otherwise identical. In other embodiments, dimensional data structure program 130 may identify two of the log entries 110 as overlapping if their timestamps are within one minute of each other unless the two of the log entries 110 have a different author or a different context. In such embodiments, the dimensional data structure program 130 may remove overlapping log entries.

In some embodiments, overlap elimination may include analyzing layers within the dimensional data structure 140. For example, layers may be analyzed using existing software libraries. In some embodiments, granularities may be organized into one layer with multiple contexts paths connecting one granularity to multiple other log entries within the log entries 110. In some embodiments, overlap elimination may involve filters made to identify redundancies based on context granularity, context paths, context aspects, overlap elimination, and/or spatial context.

Figure 4:
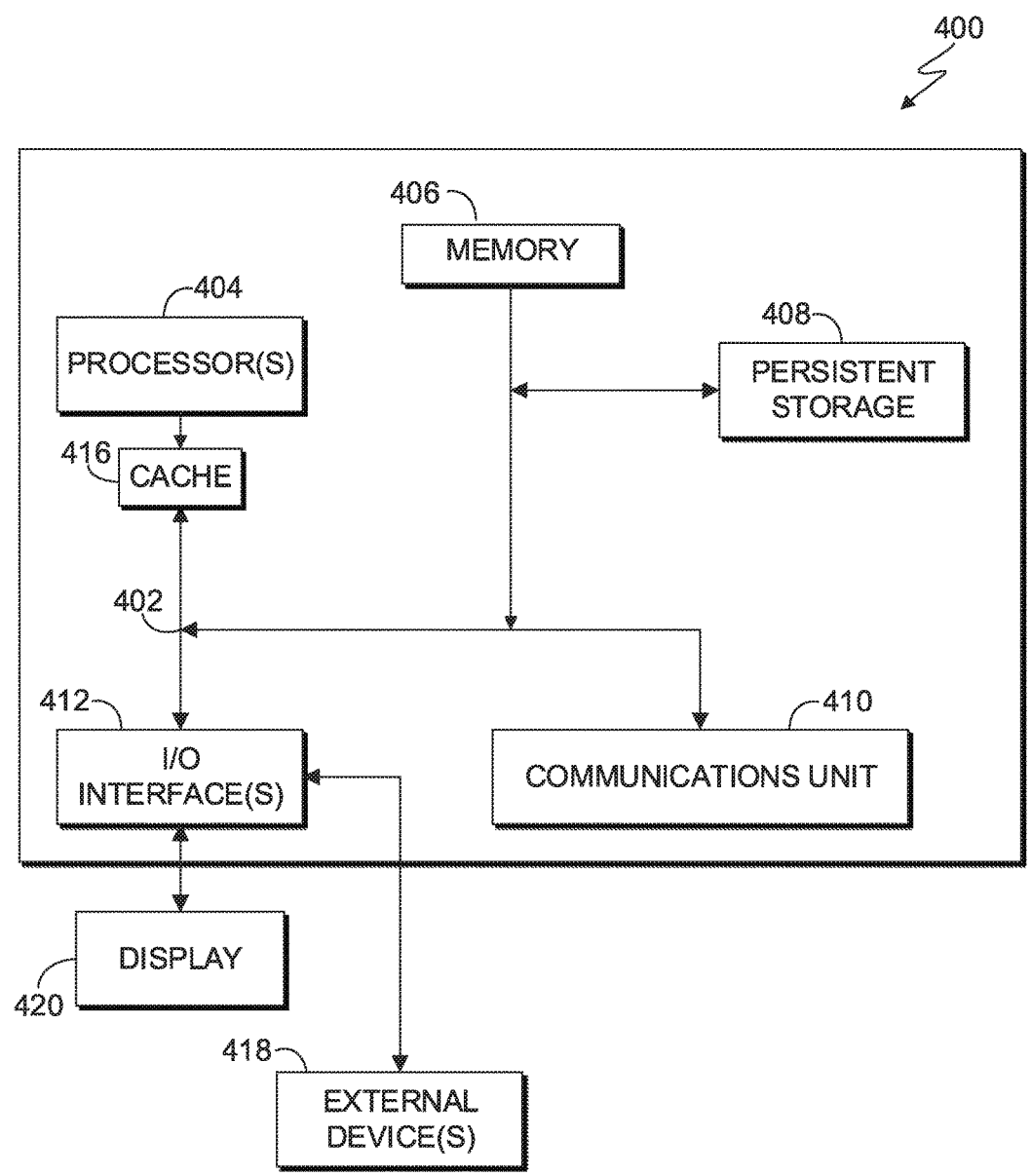
FIG. 4 is a block diagram of components of a computing apparatus suitable for executing a dimensional data structure program, in accordance with at least one embodiment of the present invention.

FIG. 4 is a block diagram depicting components of a computer 400 suitable for executing the dimensional data structure program 130. FIG. 4 displays the computer 400, the one or more processor(s) 404 (including one or more computer processors), the communications fabric 402, the memory 406, the RAM 416, the cache 416, the persistent storage 408, the communications unit 410, the I/O interfaces 412, the display 420, and the external devices 418. It should be appreciated that FIG. 4 provides only an illustration of one embodiment and does not imply any limitations with regard to the environments in which different embodiments may be implemented. Many modifications to the depicted environment may be made.

As depicted, the computer 400 operates over a communications fabric 402, which provides communications between the cache 416, the computer processor(s) 404, the memory 406, the persistent storage 408, the communications unit 410, and the input/output (I/O) interface(s) 412. The communications fabric 402 may be implemented with any architecture suitable for passing data and/or control information between the processors 404 (e.g. microprocessors, communications processors, and network processors, etc.), the memory 406, the external devices 418, and any other hardware components within a system. For example, the communications fabric 402 may be implemented with one or more buses or a crossbar switch.

The memory 406 and persistent storage 408 are computer readable storage media. In the depicted embodiment, the memory 406 includes a random access memory (RAM). In general, the memory 406 may include any suitable volatile or non-volatile implementations of one or more computer readable storage media. The cache 416 is a fast memory that enhances the performance of computer processor(s) 404 by holding recently accessed data, and data near accessed data, from memory 406.

Program instructions for the dimensional data structure program 130 may be stored in the persistent storage 408 or in memory 406, or more generally, any computer readable storage media, for execution by one or more of the respective computer processors 404 via the cache 416. The persistent storage 408 may include a magnetic hard disk drive. Alternatively, or in addition to a magnetic hard disk drive, the persistent storage 408 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of the persistent storage 408.

The communications unit 410, in these examples, provides for communications with other data processing systems or devices. In these examples, the communications unit 410 may include one or more network interface cards. The communications unit 410 may provide communications through the use of either or both physical and wireless communications links. Dimensional data structure program 130 may be downloaded to the persistent storage 408 through the communications unit 410. In the context of some embodiments of the present invention, the source of the various input data may be physically remote to the computer 400 such that the input data may be received and the output similarly transmitted via the communications unit 410.

The I/O interface(s) 412 allows for input and output of data with other devices that may operate in conjunction with the computer 400. For example, the I/O interface 412 may provide a connection to the external devices 418, which may include a keyboard, keypad, a touch screen, and/or some other suitable input devices. External devices 418 may also include portable computer readable storage media, for example, thumb drives, portable optical or magnetic disks, and memory cards. Software and data used to practice embodiments of the present invention may be stored on such portable computer readable storage media and may be loaded onto the persistent storage 408 via the I/O interface(s) 412. The I/O interface(s) 412 may similarly connect to a display 420. The display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A computer-implemented method comprising:
    identifying a plurality of log entries;
    receiving one or more criteria, said one or more criteria being applicable to said plurality of log entries;
    generating a dimensional data structure, said dimensional data structure comprising at least two logic layers, wherein:

each logic layer is constructed on a two-dimensional plane, said two dimensional plane having two linear dimensions, each linear dimension corresponding to one of said one or more criteria;

loading said plurality of log entries into said dimensional data structure based on said one or more criteria; and connecting at least two of said plurality of log entries by a third linear dimension between said at least two logic layers to form a three-dimensional space, said third linear dimension corresponding to one of said one or more criteria.

2. The computer-implemented method of claim 1, wherein said one or more criteria comprise time, log level, and context.

3. The computer-implemented method of claim 1, further comprising:

generating at least one log path, said at least one log path connecting at least two of said plurality of log entries.

4. The computer-implemented method of claim 3, further comprising:

identifying said at least one log path based on at least one of said one or more criteria; and identifying a root for each of said at least one log path, said root being for an error.

5. The computer-implemented method of claim 1, further comprising:

identifying overlapping log entries, said overlapping log entries being based on said one or more criteria; and removing said overlapping log entries.

6. The computer-implemented method of claim 1, further comprising displaying said dimensional data structure, said dimensional data structure being displayed as at least one of:

a multidimensional array; and a three-dimensional scatter plot.

7. A computer program product comprising:

one or more computer readable storage media and program instructions stored on said one or more computer readable storage media, said program instructions comprising instructions to:

identify a plurality of log entries;

receive one or more criteria, said one or more criteria being applicable to said plurality of log entries;

generate a dimensional data structure, said dimensional data structure comprising at least two logic layers, wherein:

each logic layer is constructed on a two-dimensional plane, said two dimensional plane having two linear dimensions, each linear dimension corresponding to one of said one or more criteria;

load said plurality of log entries into said dimensional data structure based on said one or more criteria; and connect at least two of said plurality of log entries by a third linear dimension between said at least two logic layers to form a three-dimensional space, said third linear dimension corresponding to one of said one or more criteria.

8. The computer program product of claim 7, wherein said one or more criteria comprise time, log level, and context.

9. The computer program product of claim 7, further comprising instructions to:

generate at least one log path, said at least one log path connecting at least two of said plurality of log entries.

10. The computer program product of claim 9, further comprising instructions to:

identify said at least one log path based on at least one of said one or more criteria; and identify a root for each of said at least one log path, said root being for an error.

11. The computer program product of claim 7, further comprising instructions to:

identify overlapping log entries, said overlapping log entries being based on said one or more criteria; and remove said overlapping log entries.

12. The computer program product of claim 7, further comprising instructions to display said dimensional data structure, said dimensional data structure being displayed as at least one of:

a multidimensional array; and a three-dimensional scatter plot.

13. A computer system comprising:

one or more computer processors;

one or more computer readable storage media;

computer program instructions; and said computer program instructions being stored on said computer readable storage media for execution by at least one of said one or more processors, said computer program instructions comprising instructions to:

identify a plurality of log entries;

receive one or more criteria, said one or more criteria being applicable to said plurality of log entries;

generate a dimensional data structure, said dimensional data structure comprising at least two logic layers, wherein:

each logic layer is constructed on a two-dimensional plane, said two dimensional plane having two linear dimensions, each linear dimension corresponding to one of said one or more criteria;

load said plurality of log entries into said dimensional data structure based on said one or more criteria; and connect at least two of said plurality of log entries by a third linear dimension between said at least two logic layers to form a three-dimensional space, said third linear dimension corresponding to one of said one or more criteria.

14. The computer system of claim 13, wherein said one or more criteria comprise time, log level, and context.

15. The computer system of claim 13, further comprising instructions to:

generate at least one log path, said at least one log path connecting at least two of said plurality of log entries.

16. The computer program product of claim 15, further comprising instructions to:

identify said at least one log path based on at least one of said one or more criteria; and identify a root for each of said at least one log path, said root being for an error.

17. The computer system of claim 13, further comprising instructions to:

identify overlapping log entries, said overlapping log entries being based on said one or more criteria; and remove said overlapping log entries.

18. The computer system of claim 13, further comprising instructions to display said dimensional data structure, said dimensional data structure being displayed as at least one of:

a multidimensional array; and a three-dimensional scatter plot.

* * * * *